(12) United States Patent
Wentink

(10) Patent No.: US 8,849,315 B2
(45) Date of Patent: Sep. 30, 2014

(54) SYSTEMS AND METHODS FOR RETRIEVING BUFFERED DATA FROM AN ACCESS POINT

(75) Inventor: Menzo Wentink, Utrecht (NL)

(73) Assignee: Conexant Systems, Inc., Irvine, CA (US)

( * ) Notice: Subject to any disclaimer, the term of this patent is extended or adjusted under 35 U.S.C. 154(b) by 1374 days.

(21) Appl. No.: 11/954,579

(22) Filed: Dec. 12, 2007

(65) Prior Publication Data

US 2008/0146253 A1 Jun. 19, 2008

Related U.S. Application Data

(60) Provisional application No. 60/875,734, filed on Dec. 19, 2006, provisional application No. 60/880,109, filed on Jan. 12, 2007.

(51) Int. Cl.
| | |
|---|---|
| *H04W 68/00* | (2009.01) |
| *H04W 52/02* | (2009.01) |
| *H04W 68/02* | (2009.01) |
| *H04W 48/14* | (2009.01) |
| *H04W 76/04* | (2009.01) |
| *H04W 84/12* | (2009.01) |
| *H04W 60/02* | (2009.01) |

(52) U.S. Cl.
CPC .......... *H04W 68/02* (2013.01); *H04W 52/0216* (2013.01); *H04W 48/14* (2013.01); *H04W 76/04* (2013.01); *H04W 84/12* (2013.01); *H04W 60/02* (2013.01)
USPC ......................................................... 455/458

(58) Field of Classification Search
USPC ................................................. 455/571, 574
See application file for complete search history.

(56) References Cited

U.S. PATENT DOCUMENTS

| | | | |
|---|---|---|---|
| 5,237,603 | A | 8/1993 | Yamagata et al. |
| 5,627,882 | A | 5/1997 | Chien et al. |
| 6,002,918 | A | 12/1999 | Heiman et al. |
| 6,463,307 | B1 | 10/2002 | Larsson et al. |
| 6,584,330 | B1 | 6/2003 | Ruuska |
| 6,829,288 | B2 | 12/2004 | Orava |
| 6,859,135 | B1 | 2/2005 | Elliott |
| 7,251,235 | B2 | 7/2007 | Wentink |

(Continued)

OTHER PUBLICATIONS

IEEE P802.11v/D0.05 Draft Amendment to Standard for Information Technology—Telecommunications and Information Exchange Between Systems—LAN/MAN Specific Requirements; Part 11: Wireless Medium Access Control (MAC) and physical layer (PHY) specifications; Amendment v: Wireless Network Management; Prepared by IEEE 802.11 Working Group of the IEEE Committee; Sep. 2006.

(Continued)

*Primary Examiner* — Olumide T Ajibade Akonai
*Assistant Examiner* — Shantell L Heiber
(74) *Attorney, Agent, or Firm* — Farjami & Farjami LLP

(57) ABSTRACT

Systems and methods for retrieving data from an access point within a wireless communications system are described. At least one embodiment includes a method for retrieving buffered data in a wireless communication system. In accordance with some embodiments, the method comprises transmitting a paging request to a plurality of access points while in a low power mode, receiving a Paging Indication element or a TIM Response element while remaining in low power mode, and exiting low power mode if buffered data is present and retrieving the buffered data. The Paging Indication element or TIM Response element indicates whether buffered data is present.

19 Claims, 5 Drawing Sheets

(56) References Cited

U.S. PATENT DOCUMENTS

| | | |
|---|---|---|
| 7,440,416 B2 | 10/2008 | Mahany et al. |
| 7,542,437 B1 | 6/2009 | Redi et al. |
| 7,583,639 B2 | 9/2009 | Mahany |
| 7,672,264 B2 | 3/2010 | Babin |
| 7,869,836 B2 * | 1/2011 | Kim .................... 455/574 |
| 7,881,755 B1 * | 2/2011 | Mishra et al. .......... 455/574 |
| 2003/0114204 A1 | 6/2003 | Allen et al. |
| 2003/0231608 A1 * | 12/2003 | Wentink ................ 370/338 |
| 2004/0062200 A1 | 4/2004 | Kesavan |
| 2005/0036469 A1 | 2/2005 | Wentink |
| 2005/0048966 A1 * | 3/2005 | Semper ................ 455/425 |
| 2005/0122927 A1 * | 6/2005 | Wentink ................ 370/311 |
| 2005/0135295 A1 | 6/2005 | Walton et al. |
| 2005/0185738 A1 | 8/2005 | Gaikwad |
| 2005/0220145 A1 * | 10/2005 | Nishibayashi et al. ....... 370/474 |
| 2005/0249227 A1 * | 11/2005 | Wang et al. ............ 370/412 |
| 2007/0036097 A1 * | 2/2007 | Costa et al. ............ 370/318 |
| 2007/0105600 A1 * | 5/2007 | Mohanty et al. ........ 455/574 |
| 2007/0264955 A1 * | 11/2007 | Tsai et al. .............. 455/186.1 |
| 2007/0268872 A1 | 11/2007 | Cromer et al. |
| 2008/0056201 A1 | 3/2008 | Bennett |
| 2008/0081675 A1 | 4/2008 | Pinder |
| 2008/0123577 A1 * | 5/2008 | Jaakkola et al. ........ 370/311 |
| 2008/0144591 A1 * | 6/2008 | Jokela ................... 370/338 |
| 2008/0161072 A1 | 7/2008 | Lide |
| 2009/0080377 A1 | 3/2009 | Ganguly et al. |
| 2009/0137206 A1 | 5/2009 | Sherman et al. |
| 2009/0189981 A1 | 7/2009 | Siann et al. |
| 2009/0207826 A1 | 8/2009 | Bitran et al. |

OTHER PUBLICATIONS

IEEE Standard for Information Technology—Telecommunications and Information Exchange between systems—local and metropolitan area networks—Specific Requirements, Part 11: Wireless LAN Medium Access Control (MAC) and Physical Layer (PHY) Specifications, Jun. 12, 2007, IEEE Computer Society, IEEE Std. 802. Nov. 2007.

U.S. Patent and Trademark Office, International Search Report, PCT Application No. PCT/US2008/075184, Nov. 14, 2008.

U.S. Patent and Trademark Office, Written Opinion, PCT Application No. PCT/US2008/075184, Nov. 14, 2008.

International Bureau of WIPO, International Preliminary Report on Patentability, PCT Application No. PCT/US2008/075184, Mar. 9, 2010.

Chinese Patent Office; Response to Office Action; Chinese Application No. 200880105714.1; Dec. 2, 2011.

* cited by examiner

SYSTEMS AND METHODS FOR RETRIEVING BUFFERED DATA FROM AN ACCESS POINT

CROSS-REFERENCE TO RELATED APPLICATION

This application claims priority to, and the benefit of, U.S. Provisional Patent Application entitled, "TIM Request," having Ser. No. 60/875,734, filed on Dec. 19, 2006, which is incorporated by reference in its entirety. This application also claims priority to, and the benefit of, U.S. Provisional Patent Application entitled, "TIM Request," having Ser. No. 60/880,109, filed on Jan. 12, 2007, which is also incorporated by reference in its entirety.

TECHNICAL FIELD

The present disclosure generally relates to wireless communications and more particularly relates to systems and methods for retrieving buffered data from an access point (AP).

BACKGROUND

Stations in standby mode that are associated with an access point (AP) must periodically wake up to receive a TIM (Traffic Indication Map) element, which is contained inside the beacon. The TIM element indicates whether the AP has buffered data for the station. However, the length of beacons has grown over time, and beacons are generally transmitted at a low (if not the lowest) PHY rate. Therefore, the cost of receiving beacons from a power consumption standpoint is high. This has an adverse effect on the battery life of handheld devices. Accordingly, various needs exist in the industry to address the aforementioned deficiencies and inadequacies.

SUMMARY

Briefly described, one embodiment, among others, includes a method for retrieving buffered data in a wireless communication system. In accordance with some embodiments, the method comprises transmitting a paging request to a plurality of access points while in a low power mode, receiving a Paging Indication element or a TIM Response element while remaining in low power mode, and exiting low power mode if buffered data is present and retrieving the buffered data. The Paging Indication element or TIM Response element indicates whether buffered data is present.

Another embodiment includes a method for retrieving buffered data in a wireless communication system. The method comprises receiving a paging request from a station and in response to the paging request and sending a TIM response to the station if buffered data is present. In accordance with some embodiments, the step of sending the TIM response is performed according to a no ACK policy so that the station remains in low power mode.

Yet another embodiment includes a system for retrieving buffered data in a wireless communication system. The system comprises a station configured to transmit a paging request while in low power mode to determine whether buffered data is available for the station and one or more access points configured to receive the paging request from the station and send one of a TIM element and a Paging Indication element to the station if buffered data is available. For some embodiments, the one or more access points send either the TIM element or the Paging Indication element based on information being requested from the access points by the station.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
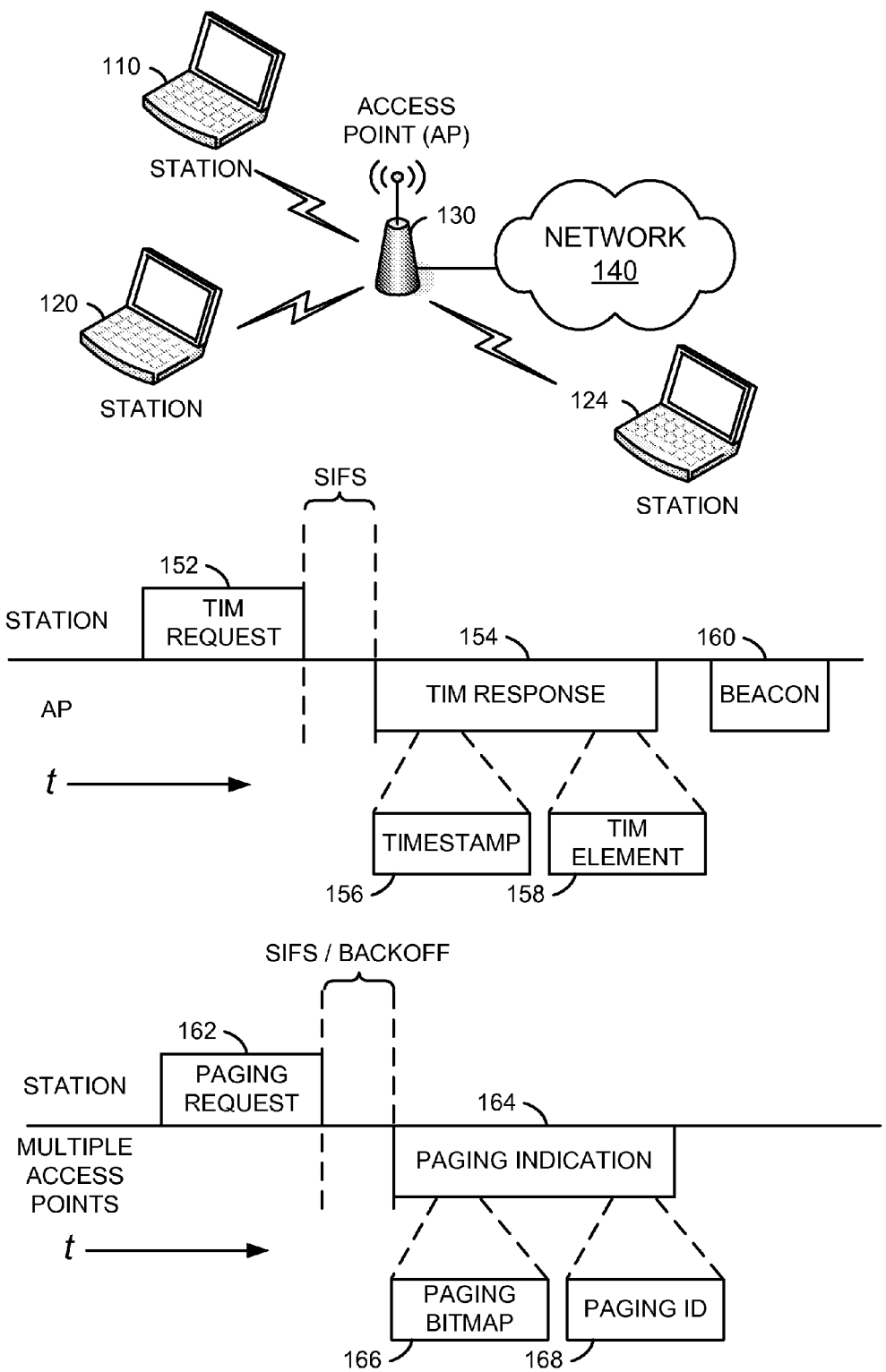
FIG. 1A depicts an embodiment of a system configured to perform TIM request/response exchanges and Page Indication element exchanges to retrieve buffered data from an access point.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As known by those skilled in the art, an access point (AP) periodically sends a TIM (Traffic Indication Map) within a beacon to identify which stations (STAs) in a power saving mode have data frames waiting for them in the AP's buffer. The TIM identifies a station by the association ID that the access point assigned during the association process. One perceived shortcoming, however, is that stations in standby mode that are associated with the AP must periodically wake up to receive the TIM. Given the length of beacons, this can affect the rate of power consumption associated of STAs.

Exemplary embodiments described herein are directed to TIM and Paging Indication element exchanges for retrieving buffered data from an AP while allowing the STAs to remain in a low power mode, thereby reducing power consumption. A station first sends a TIM request to an AP. Upon receiving a TIM response from the AP, the station determines whether the AP has any buffered data for that particular station. It should be noted that a station that utilizes a TIM request according to exemplary embodiments described herein does not need to wake up in order to receive beacons. As known by those skilled in the art, Broadcast/Multicast (BM) traffic can be received without receiving a beacon via the FBMS (Flexible Broadcast/Multicast Service) mechanism.

Reference is made to FIG. 1A, which depicts an embodiment of a system configured to perform TIM request/response exchanges and Page Indication element exchanges to retrieve buffered data from an access point. Among other things, FIG. 1A illustrates a typical network configuration for communicating data between stations via an access point in a WLAN or 802.11-based network. As illustrated in the non-limiting example of FIG. 1, a network 140 may be coupled to an access point 130. In some embodiments, the network 140 may be the Internet, for example. The access point 130 can be configured to provide wireless communications to various wireless devices or stations 110, 120, 124. Depending on the particular configuration, the stations 110, 120, 124 may be a personal computer, a laptop computer, a mobile phone, a Personal Digital Assistant, and/or other device configured for wirelessly sending and/or receiving data. Furthermore, the access points 130 may be configured to provide a variety of wireless communications services, including but not limited to: WIFI services, WiMAX services, and wireless SIP services. Furthermore, the stations 110, 120, 124 may be configured for WIFI communications (including, but not limited to 802.11, 802.11b, 802.11a/b, 802.11g, and/or 802.11n).

According to embodiments described herein, rather than waiting for the AP 130 to transmit a TIM, each of the stations 110, 120, 124 poll the AP 130 to determine whether the AP 130 has any buffered data intended for it. A TIM request 152 sent by a station 110, 120, 124 is generally a relatively short frame. As depicted in FIG. 1A, in response to a TIM request 152, the AP 130 sends a TIM response 154 after a SIFS (short interface frame) time interval. The TIM response may contain a TIM element 158, which may also be transmitted inside a beacon. In accordance with some embodiments, the TIM response 154 also contains a timestamp field 156.

Figure 1B:
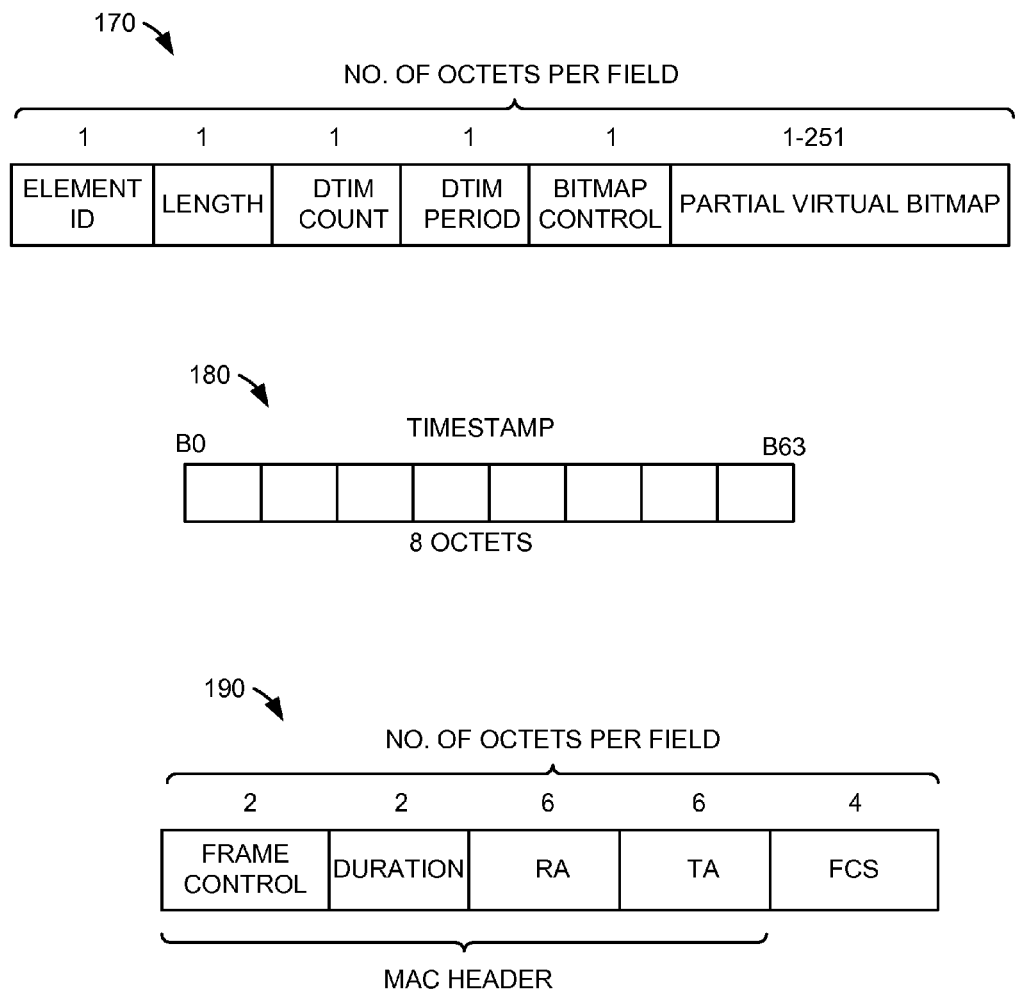
FIG. 1B depicts an embodiment of a TIM response frame with an embedded TIM element.

Reference is made to FIG. 1B, which depicts an embodiment of a TIM response frame 170 with an embedded TIM element 158. Stations use the timestamp 180 to synchronize its timing synchronization function (TSF) timer. A TSF based on the 802.11 power saving scheme may be contained in a beacon and serves to inform the station of the next window in which to listen for broadcast and unicast messages. Referring back to FIG. 1A, the station may also transmit a TIM request 152 independent of the beacon period 160. The TIM response 154 sent by the AP 130 may be acknowledged by the station 110, 120, 124 receiving the TIM response. For such embodiments, an ACK frame may be sent by the station a SIFS time interval after receiving a TIM response. It should be noted that in other embodiments, TIM responses 154 are not acknowledged.

Generally, a station utilizes a TIM request 152 to monitor whether the AP 130 has buffered traffic for that particular station. In addition, the station 110, 120, 124 can elect to not receive BM traffic and to not wake up from standby mode to receive beacons. However, the station 110, 120, 124 may also elect to enable the FBMS mechanism in order to receive BM traffic according to a pre-determined schedule while using TIM requests 152 to poll the AP 130 to see if the AP 130 has buffered data intended for that station. It should be noted that the station can achieve this while staying in a low power mode. To monitor the AP 130 for buffered data, the station 110, 120, 124 may send a TIM request 152 to the AP on a periodic basis. For such embodiments, the frequency depends on the intended level of responsiveness of the station with regards to incoming unicast traffic at the AP 130. As a non-limiting example, suppose that an incoming frame is part of a call setup. In such instances, the station should be made aware of this within a reasonable time so that call setup process is executed in a reasonable amount of time.

With reference to FIG. 1B, the TIM request 152 is a newly defined control frame subtype. The request incorporates at least two addresses—a sender address (TA) and receiver address (RA). For some embodiments, the TIM request 190 has a similar structure as an RTS (ready-to-send) frame, as illustrated in FIG. 1B. However, for TIM requests 190, the Frame Control field indicates a different subtype. As a non-limiting example, one possible control subtype (which is currently still reserved) is 0110. For this control subtype, the TIM request contains 20 octets.

While a station utilizes a TIM request to monitor whether the AP has buffered traffic for that particular station, the station can decide not to receive BM traffic and not wake up to receive a beacon, thereby reducing power consumption. In an alternative scenario, the station can decide to enable the FBMS mechanism to receive selected BM traffic at scheduled time instances, utilize the TIM request mechanism to monitor whether the AP has buffered traffic for that station, and never wake up to receive a beacon.

From the perspective of the AP, the TIM response sent from the AP may include a field which specifies whether the AP has buffered traffic for the station receiving the TIM response. The TIM response may also contain a field which indicates whether the AP has buffered traffic for that specific station. The TIM response may be another control frame subtype than a TIM request. In other embodiments, however, the TIM frame may be a single subtype, and a second field inside the new subtype is then utilized to indicate whether the TIM frame is a request or a response. For such embodiments, an additional field is located between the TA and the FCS field shown in the TIM request 190 depicted in FIG. 1B.

In other embodiments, the AP may also be configured to transmit buffered data in response to a PS-Poll. (With conventional approaches, access points respond with an ACK and the data follows after a certain turnaround time, during which the stations must stay awake.) This embodiment is typically performed through beacons. If no traffic is buffered, the AP sends a QoS (quality of service) Null frame with the More Data bit not set and ACK policy set to No ACK. It should be noted that the No ACK policy is important because it saves energy at the stations station if no ACK frame has to be sent. If the AP supports this capability, the station periodically sends a PS-Poll to the AP rather than a TIM request and does not wake up to listen to beacons. The AP may include a timestamp field in its response frame. It should be noted, however, that for such embodiments, the AP must perform a station-specific lookup, which is generally more complex than returning a TIM element (which is the same for all stations).

In accordance with alternative embodiments to the TIM request/response exchange described earlier, an AP indicates that there is no traffic buffered at that AP by setting an EOSP (end of service period) bit. Generally, the ACK policy for such embodiments is set to "No ACK." It should be noted that the ACK policy is set to a No ACK policy as this reduces power consumption at the stations since the stations don't have to transmit an ACK frame. For access points and stations that incorporate this alternative scheme involving Paging Indication elements, stations periodically send a PS-Poll to the AP, rather than a TIM request. It should be noted that with such embodiments, the stations still do not wake up to listen to beacons, thereby reducing power consumption. As with the TIM response described earlier, the AP may include a timestamp field in its response frame.

As discussed above, a TIM element indicates the presence of traffic which is locally buffered at the AP to which the station is associated. However, in some scenarios, the station might not be associated with any AP even though a particular entity has buffered data for that station. Accordingly, embodiments for utilizing Paging Indication elements (as an alternative to using TIM elements) are now described. With reference to FIG. 1A, exemplary embodiments are directed to using a Paging Indication element 164, which includes a Paging Bitmap 166 and a Paging Identification field 168.

A Paging Request 162 is sent to multiple access points within a paging group rather than to a single AP. In this regard, the station is able to "page" access points within a given paging group to determine whether any of the access points contain buffered data intended for that station. A status field within the Paging Indication element 164 provides the status (when requested) to the station that requested the status update. Various embodiments for such information exchanges are now described. As depicted in FIG. 1A, the response to such requests may be generally classified as either 1) a SIFS response in the case of a unicast request; or 2) a response sent after a back-off period in the case of a broadcast request. When Paging Indication elements are used in a response, the contents of the response are global rather than local to the responding AP.

Paging Indication Elements

In accordance with exemplary embodiments, a Paging Indication element is utilized to indicate the presence of buffered traffic. A Paging Indication element contains a Paging Bitmap field and a Paging ID List field as shown below in Table 1. The Element ID contains a value which identifies a Paging Identification element. The length of the Paging Indication element shown in Table 1 provides the length of the information field, the derivation of which is described below.

In accordance with exemplary embodiments, the Paging Indication Information Element contains a Paging Bitmap field and Paging ID List field. The format of a Paging Indication element is shown in the table below.

TABLE 1

| | Element ID | Length | Paging Bitmap | Paging ID List |
|---|---|---|---|---|
| Octets: | 1 | 1 | 8 | 1-244 |

The Paging Bitmap field within the Paging Indication element consists of 64 bits and is organized into 8 octets such that the bit number N (where $0 \leq N \leq 64$) in the Paging Bitmap field corresponds to bit number (N mod 8) in octet number [N/8] where the low-order bit of each octet is bit number 0, and the high order bit is bit number 7. Each bit in the Paging Bitmap corresponds to a Paging Index of one or more STAs (stations) in the Paging Group. Bit number N is 0 if there is no Paging Indication for the STAs with Paging Index N. The Paging Index is a 6-bit hash value of the STA Paging ID. The hash value is derived using the following steps:

```
hash= 0;
for i=0, ...5
    hash :=(7*hash +a[i]) mod 64;
``` where a[i] denotes the $i^{th}$ octet of the Paging ID. Finally, the Paging ID List in the Paging Indication element is a variable length field containing anywhere from 1 to 122 2-octet Paging IDs.

As such, an exchange similar to the exemplary TIM request/response scheme described earlier is used to obtain a Paging Information Element. A Paging Information Element (as with the TIM field) contains information about the presence of unicast data, but the validity of the information is applicable to a set of access points by paging multiple access points, rather than to one specific AP when using TIM fields. Accordingly, both TIM request/response and Paging Indication element transactions may be utilized to provide a reduction in power consumption. A high-level framework which applies to both types of exchanges is now described.

First, various control frame subtypes and corresponding subtype values are shown below in Table 2. A subtype value of 0101 indicates that the control frame subtype is a paging request, whereas a subtype value of 0110 indicates that the control frame subtype is a paging response.

TABLE 2

| Type value b3 b2 | Type description | Subtype value b7 b6 b5 b4 | Subtype description |
|---|---|---|---|
| 01 | Control | 0000-0100 | Reserved |
| 01 | Control | 0101 | Paging Request |
| 01 | Control | 0110 | Paging Response |

Next, the frame format for the Paging Request frame (i.e., subtype value equal to 0101) is shown below in Table 3.

TABLE 3

| | Frame Control | Duration/ID | RA | TA | Element ID |
|---|---|---|---|---|---|
| Octets: | 2 | 2 | 6 | 6 | 1 |

The Duration/ID field value shown above may be greater than or equal to the time, in microseconds, required to transmit a solicited response frame plus an SIFS interval. If the calculated duration includes a fractional microsecond, that value is rounded up to the next higher integer. The RA field contains the address of the recipient STA or a broadcast address. The TA field contains the address of the STA transmitting the Paging frame. Finally, the Element ID field contains the ID of the requested Information Element. The value of this field indicates whether the frame is a TIM response or a Paging Indication element.

Paging Response Frame—Format

The frame format for a Paging Response frame is shown below in Table 4.

TABLE 4

| | Frame Control | Duration/ID | RA | Paging Indication Information Element |
|---|---|---|---|---|
| Octets: | 2 | 2 | 6 | 6-256 |

In accordance with some embodiments, the Duration/ID field value is set to 0 for Paging Response frames. The RA field contains the address of the recipient STA. (This is copied from the TA field of the Paging Request frame.) Finally, the Paging Indication Information Element field contains the requested Information Element, starting with the Element ID. The format of the Paging Indication element is now described.

Paging Indication Element—Format

As described earlier, the Paging Indication Information Element contains a Paging Bitmap field and Paging ID List field. The format of the Paging Indication element is shown in the table below.

The Element ID contains a value which identifies a Paging Identification element. The Length field for this element indicates the length of the information field, which is constrained as described below. The Paging Bitmap field consists of 64 bits and is organized into 8 octets such that bit number N (where $0 \leq N \leq 64$) in the bitmap corresponds to bit number (N mod 8) in octet number [N/8] where the low-order bit of each octet is bit number 0, and the high order bit is bit number 7. Each bit in the Paging Bitmap corresponds to a Paging Index of one or more STAs (stations) in the Paging Group. Bit number N is 0 if there is no Paging Indication for the STAs with Paging Index N. The Paging Index is a 6-bit hash value of the STA Paging ID.

STA Operation for Receiving a Paging Indication Element

As the general formats for the various control subtype frames in a paging indication scheme have been described, exemplary steps for receiving a Paging Indication element at an STA (station) are now described. From a high level, a STA in Idle (or low power) Mode wakes up prior to the end of the Paging Interval, transmits a Paging Request frame (to request a Paging Indication element), and receives a Paging Response frame that contains a Paging Indication element. The STA then checks to determine if the bit corresponding to its Paging ID is set in the Paging Indication element. If that STA's Paging Index bit is set, the STA (while still in idle mode) searches the Page ID List field for its Paging ID.

When the STA detects that the bit corresponding to its Paging ID in the Paging Indication element is set and that its Paging ID is present in the Page ID list field, the STA exits Idle Mode and takes corresponding actions to associate to an AP and to retrieve the buffered traffic. On the other hand, if a STA's Paging index bit is not set, the STA remains in Idle Mode operation. If a STA's Paging Index bit is set but its Paging ID is not present in the Paging ID List field, the STA also remains Idle Mode operation in such instances. A STA in Idle Mode may send a Probe Request frame containing a Paging Service Element on supported channels in the Regulatory Class where the channel is valid for the current regulatory domain. The Paging Interval and DPIM Count are set to 0 in the Paging Service element contained in the Probe Request. An AP that supports the Paging Service responds with a Probe Response frame that includes the Paging Indication element.

According to certain embodiments, a STA in Idle Mode may send a Paging Request frame to request either a Paging Indication element or a TIM Element. When the Paging Request is received on a unicast address, the Paging Response frame shall be sent after an SIFS interval. If the Paging Request is received on a Broadcast address, the Paging Response is sent after a short back-off period (e.g., through a Voice AC). As discussed earlier, the Paging Response is not acknowledged in either case. That is, a No Ack policy is incorporated in order to reduce power consumption by the STA.

Figure 2:
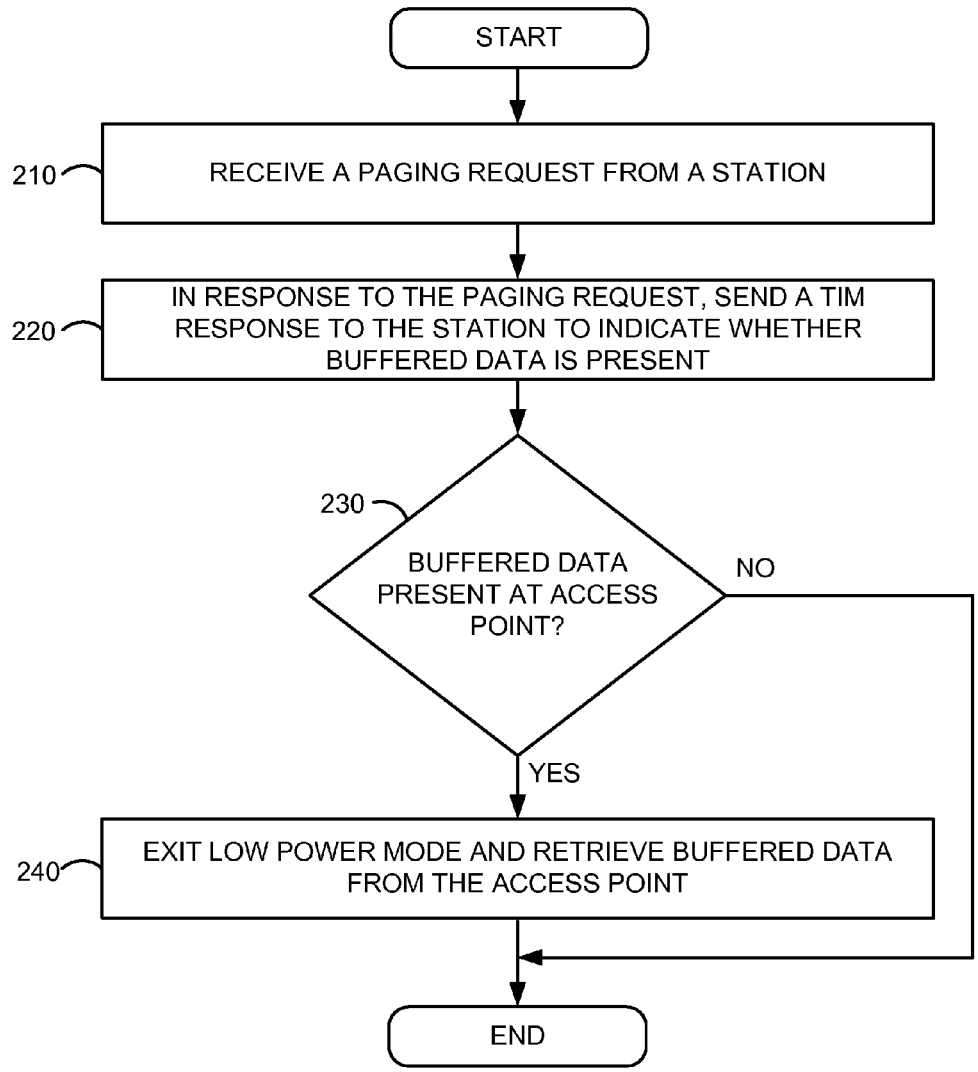
FIG. 2 depicts an embodiment of a method for performing TIM request/response exchanges to retrieve buffered data from an access point.

Reference is now made to FIG. 2, which depicts an embodiment of a method for performing TIM request/response exchanges to retrieve buffered data from an access point. Beginning in step 210, a paging request is received from a station polling the access point for any buffered data. A TIM response is sent back to the station to notify the station whether buffered data is present at the AP (220). If the access point has buffered data for the station (condition block 230), the station exits low power mode and proceeds to retrieve the buffered data from the AP (step 240). It should be noted that for exemplary embodiments, the step of receiving the TIM response is performed while the station remains in a low power mode, thereby reducing power consumption of the station.

Figure 3:
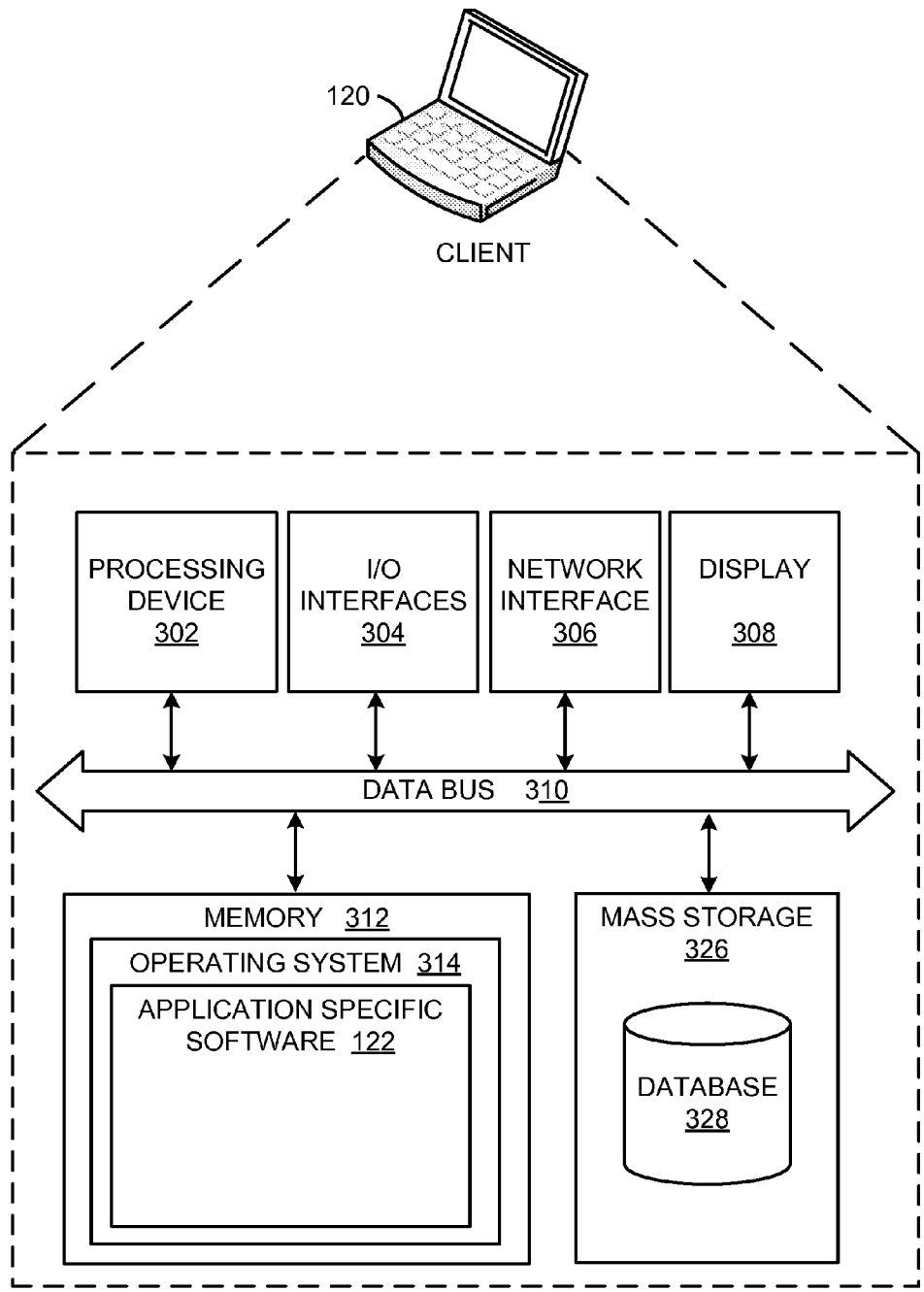
FIG. 3 illustrates an embodiment of one of the wireless devices/stations shown in FIG. 1A for executing the various steps depicted in FIG. 2.

FIG. 3 illustrates an embodiment of one of the wireless devices/stations shown in FIG. 1A for executing the various steps depicted in FIG. 2. Generally speaking, station 120 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the stations 120 can, for instance, comprise memory 312, a processing device 302, a number of input/output interfaces 304, a network interface 306, a display 308, and mass storage 324, wherein each of these devices are connected across a data bus 310.

Processing device 302 can include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 122 such as logic for performing TIM request/response exchanges in addition to Page Indication element exchanges with an access point. It should be noted, however, that the logic for performing these processes can also be implemented in hardware or a combination of software and hardware. One of ordinary skill in the art will appreciate that the memory 312 can, and typically will, comprise other components which have been omitted for purposes of brevity.

Input/output interfaces 304 provide any number of interfaces for the input and output of data. For example, where the station 120 comprises a personal computer, these components may interface with user input device 304, which may be a keyboard or a mouse. Where the station 120 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The station 120 may further comprise mass storage 326. For some embodiments, the mass storage 326 may include a database 328 to store and manage such data as metadata.

Figure 4:
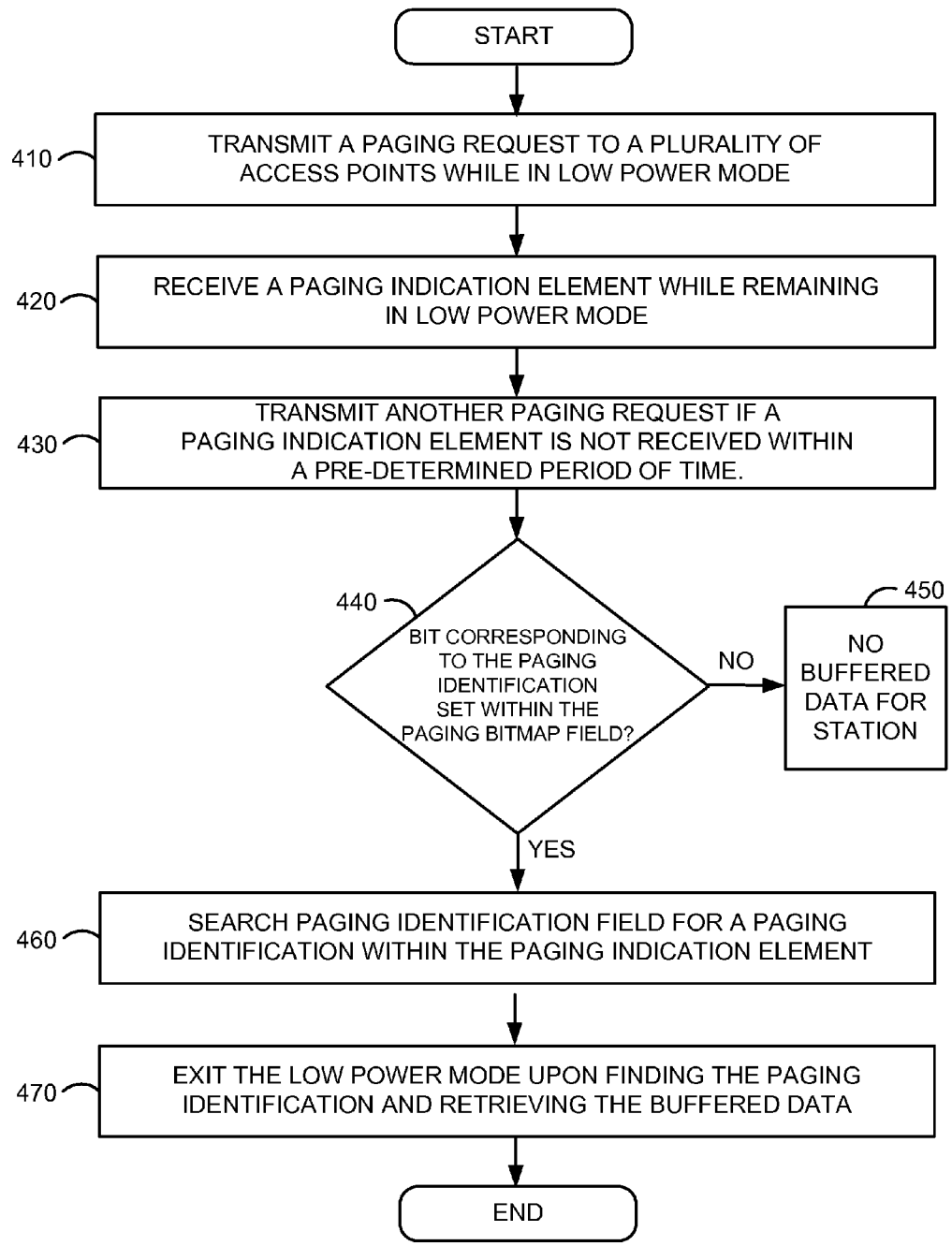
FIG. 4 depicts an embodiment of a method for performing Paging Indication element exchanges to retrieve buffered data from an access point.

FIG. 4 depicts an embodiment of a method for performing Paging Indication element exchanges to retrieved buffered data from an access point. Beginning with step 410, a paging request is transmitted by a station to a plurality of access points while in low power mode. As discussed earlier, under some operating conditions, the station might not be associated with any AP. A paging request is thus sent to "page" various access points to determine whether there is any buffered data intended for the station.

In response to receiving a paging request from the station, each access point then sends a Paging Indication element to notify the station whether any buffered data exists (step 420). As discussed earlier, the station and access point may operate under a no ACK policy where transmitted frames are not acknowledged. This allows the station to remain in a low power mode. Accordingly, in the event that a Paging Indication element is not received within a pre-determined time, the station simply resends the paging request (step 430). Next, a determination is made on whether a bit within the Paging Bitmap that corresponds to the Paging Identification field is set (condition block 440). If the bit is not set, then there is no buffered data (step 450). If the bit is set within the Paging Bitmap, then the station proceeds to search the Paging Identification field for a Paging ID (step 460). Upon finding the Paging ID, the station then exits the low mode power mode of operation and proceeds to retrieve the buffered data (step 470).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method for retrieving buffered data in a wireless communication system, the method comprising:
   transmitting a Paging Request frame to request a Paging Indication element to one or a plurality of access points while in a low power mode in which a beacon frame is unable to be detected;
   receiving the Paging Indication element or a TIM Response element while remaining in low power mode, wherein the Paging Indication element or the TIM Response element indicates whether the buffered data is present; and
   exiting the low power mode if the buffered data is present and retrieving the buffered data, wherein transmitting the Paging Request frame while in the low power mode is performed according to a pre-determined frequency, wherein the pre-determined frequency is derived based on a required level of responsiveness to incoming unicast traffic.

2. The method of claim 1, further comprising transmitting another Paging Request frame if the Paging Indication element is not received within a predetermined period of time.

3. The method of claim 1, wherein the Paging Request frame request is a TIM request sent to a particular access point.

4. The method of claim 1, wherein the Paging Request frame is a PS-Poll sent to a particular access point, and wherein the Paging Indication element is a short No-ACK Data frame with at least one of a More Data (MD) bit and an End of Service Period (EOSP) bit set.

5. The method of claim 1, wherein transmitting the Paging Request frame comprises sending the Paging Request frame to the plurality of access points within a pre-defined Paging Group in order to request the Paging Indication element.

6. The method of claim 1, wherein transmitting the Paging Request frame is performed independent of time intervals designated for receiving beacons.

7. The method of claim 1, wherein receiving the Paging Indication element comprises receiving a TIM and a timestamp, wherein the TIM indicates presence of the buffered data for a station, and wherein the timestamp is used by the station to synchronize a TSF (timing synchronization function) timer.

8. A method for retrieving buffered data in a wireless communication system, the method comprising:
   receiving a paging request from a station in low power mode that is not enabled to receive a beacon frame; and
   in response to the paging request, sending a TIM response to the station if the buffered data is present, wherein sending the TIM response is performed according to a no ACK policy so that the station remains in the low power mode, wherein receiving the paging request from the station in the low power mode is performed according to a pre-determined frequency, wherein the pre-determined frequency is derived based on a required level of responsiveness to incoming unicast traffic.

9. The method of claim 8, wherein the paging request is a TIM request sent to a particular access point.

10. The method of claim 8, wherein sending the TIM response to the station comprises sending the TIM response after a SIFS (short interface frame) time interval to indicate whether the buffered data is present.

11. The method of claim 10, wherein sending the TIM response after the SIFS time interval is performed if the paging request was received through a unicast address.

12. The method of claim 8, wherein sending the TIM response to the station comprises sending the TIM response after a pre-determined backoff period if the paging request was received through a broadcast address.

13. The method of claim 8, wherein sending the TIM response comprises sending a TIM and a timestamp, wherein the TIM indicates presence of the buffered data for the station, and wherein the timestamp is used by the station to synchronize a TSF (timing synchronization function) timer.

14. A wireless communication system for retrieving buffered data, the system comprising:
   a station configured to transmit a paging request frame to request a Paging Indication element while in a low power mode, the station not configured to receive a beacon frame in the low power mode, to determine whether the buffered data is available for the station; and
   one or more access points configured to receive the paging request frame from the station and send one of a TIM element and a Paging Indication element to the station if the buffered data is available, wherein the one or more access points send either the TIM element or the Paging Indication element based on information being requested from the one or more access points by the station, wherein transmission of the paging request frame while in a low power mode is performed according to a pre-determined frequency, wherein the pre-determined frequency is derived based on a required level of responsiveness to incoming unicast traffic.

15. The system of claim 14, wherein the station requests the TIM element if the station is currently associated with an access point, and wherein the station requests the Paging Indication element if the station is not currently associated with an access point.

16. The system of claim 14, wherein the station sends the paging request frame to only one access point if the station is requesting the TIM element, and wherein the station sends the paging request frame to multiple access points if the station is requesting the Paging Indication element.

17. The system of claim 14, wherein the access point is further configured to send the Paging Indication element a SIFS (short interface frame) time interval after receiving the paging request frame if the paging request frame was received through a unicast address, and wherein the access point is further configured to send the Paging Indication element after a predetermined backoff period if the paging request frame was received through a broadcast address.

18. The system of claim 14, wherein the station is configured to transmit the TIM element independent of time intervals designated for receiving beacons from an access point.

19. The system of claim 14, wherein the access point (AP) is configured transmit the TIM element according to a no ACK policy to allow the station to stay in the low power mode while receiving the TIM element.

* * * * *